United States Patent
Garikipati et al.

(10) Patent No.: US 7,125,433 B2
(45) Date of Patent: Oct. 24, 2006

(54) DUAL DIFFUSION CHANNEL FILTER

(75) Inventors: Vijay Kumar Garikipati, Eagan, MN (US); Patrick L. McPhail, Minneapolis, MN (US); Shu Lam Sin, Hong Kong (HK); Katsushi Isogawa, Eagan, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 197 days.

(21) Appl. No.: 10/749,793

(22) Filed: Dec. 31, 2003

(65) Prior Publication Data

US 2005/0139077 A1 Jun. 30, 2005

(51) Int. Cl.
*B01D 53/02* (2006.01)
*G11B 33/14* (2006.01)

(52) U.S. Cl. ............... 55/385.6; 96/139; 360/97.02
(58) Field of Classification Search ........... 55/385.1, 55/385.4, 385.6, 385.7, 516, DIG. 5; 96/134, 96/135, 139, 147, 152–154; 360/97.02, 97.03, 360/97.04; 361/690–694
See application file for complete search history.

(56) References Cited

U.S. PATENT DOCUMENTS

| | | | |
|---|---|---|---|
| 4,617,122 A | 10/1986 | Kruse et al. | |
| 4,684,510 A * | 8/1987 | Harkins | ............... 423/210 |
| 4,863,499 A | 9/1989 | Osendorf | |
| 5,030,260 A * | 7/1991 | Beck et al. | ............... 96/139 |
| RE34,497 E * | 1/1994 | Blanks | ............... 360/97.02 |
| 5,367,417 A * | 11/1994 | Brown et al. | ............... 360/97.02 |
| 5,391,426 A | 2/1995 | Wu | |
| 5,417,743 A | 5/1995 | Dauber | |
| 5,500,038 A | 3/1996 | Dauber et al. | |
| 5,538,545 A | 7/1996 | Dauber et al. | |
| 5,593,482 A | 1/1997 | Dauber et al. | |
| 5,733,271 A * | 3/1998 | Bj.o slashed.rn | ........... 604/333 |
| 5,869,009 A | 2/1999 | Bellefeuille et al. | |
| 5,876,487 A | 3/1999 | Dahlgren et al. | |
| 5,916,671 A | 6/1999 | Dauber et al. | |
| 5,980,616 A | 11/1999 | Johnson et al. | |
| 5,997,614 A | 12/1999 | Tuma et al. | |
| 5,997,618 A | 12/1999 | Schneider et al. | |
| 6,077,335 A | 6/2000 | Schneider et al. | |
| 6,143,058 A | 11/2000 | Dahlgren et al. | |
| 6,143,675 A | 11/2000 | McCollam et al. | |
| 6,146,446 A | 11/2000 | Tuma et al. | |
| 6,168,651 B1 * | 1/2001 | Tuma et al. | ................ 95/90 |
| 6,168,681 B1 | 1/2001 | Bellefeuille et al. | |
| 6,196,708 B1 | 3/2001 | Rogers | |

(Continued)

FOREIGN PATENT DOCUMENTS

JP 63-091893 A * 3/1988

(Continued)

*Primary Examiner*—Frank M. Lawrence
(74) *Attorney, Agent, or Firm*—Pauly, DeVries Smith & Deffner, LLC.

(57) ABSTRACT

A multiple diffusion channel filter assembly is disclosed. The filter assembly provides filtration of air entering and exiting an electronic enclosure through a breather hole. In one implementation, the filter assembly contains a housing with an adsorbent component and a first diffusion channel and a second diffusion channel. In another implementation, the filter assembly contains a first layer and a second layer which surround an adsorbent component and a first and a second diffusion channel that are in fluid communication with the interior space defined by the first and second layers. In yet another implementation, the invention, includes a filter accessory containing a diffusion channel configured to work in conjunction with a separate filter assembly thereby adding an additional diffusion channel to the existing design.

24 Claims, 6 Drawing Sheets

U.S. PATENT DOCUMENTS

| | | |
|---|---|---|
| 6,214,070 B1 * | 4/2001 | Crowder et al. ............... 55/320 |
| 6,214,095 B1 | 4/2001 | Logan et al. |
| 6,238,467 B1 | 5/2001 | Azarian |
| 6,296,691 B1 | 10/2001 | Gidumal |
| 6,395,073 B1 | 5/2002 | Dauber |
| 6,475,270 B1 * | 11/2002 | Graeve ........................ 96/135 |
| 6,491,741 B1 | 12/2002 | Tuma et al. |
| 6,582,113 B1 | 6/2003 | Rogers |
| 2002/0063990 A1 * | 5/2002 | Hirasaka et al. ......... 360/97.02 |
| 2002/0089781 A1 * | 7/2002 | Tuma ..................... 360/97.02 |
| 2003/0047078 A1 * | 3/2003 | Ueki et al. ..................... 96/135 |
| 2003/0056653 A1 * | 3/2003 | Ueki et al. ..................... 96/134 |
| 2003/0151847 A1 * | 8/2003 | Tsang et al. ............. 360/97.02 |
| 2004/0114273 A1 * | 6/2004 | Fujiwara et al. ......... 360/97.02 |
| 2005/0063093 A1 * | 3/2005 | Hong et al. .............. 360/97.02 |
| 2005/0092178 A1 * | 5/2005 | Lim et al. ..................... 95/273 |
| 2005/0166558 A1 * | 8/2005 | Johnson ..................... 55/385.6 |

FOREIGN PATENT DOCUMENTS

WO     WO 97/00717     1/1997

\* cited by examiner

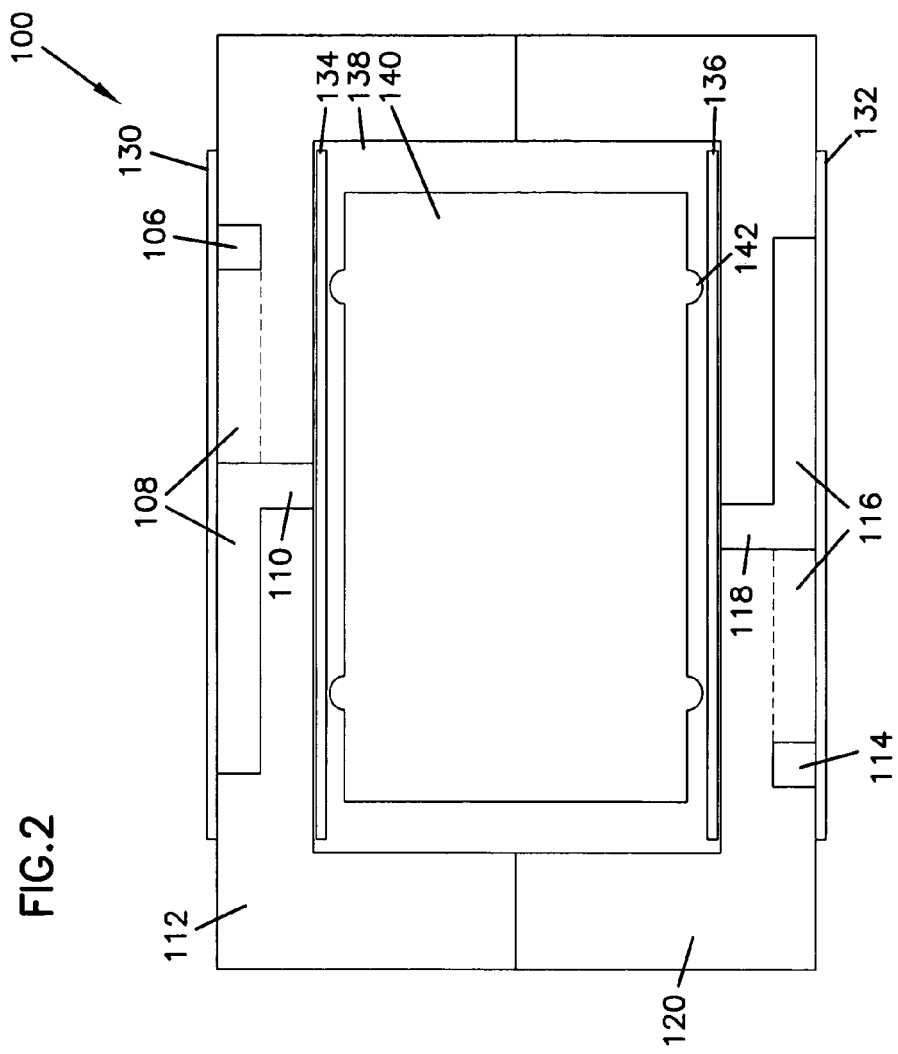
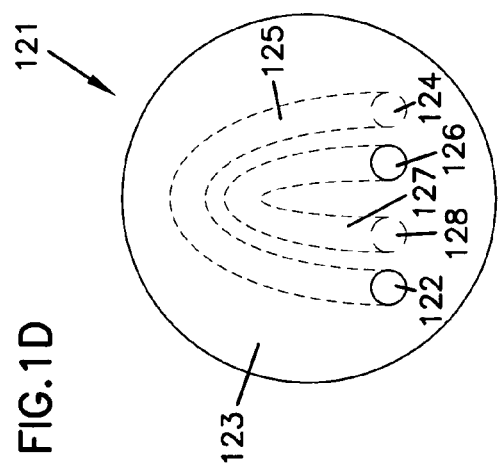
FIG.2
FIG.1D

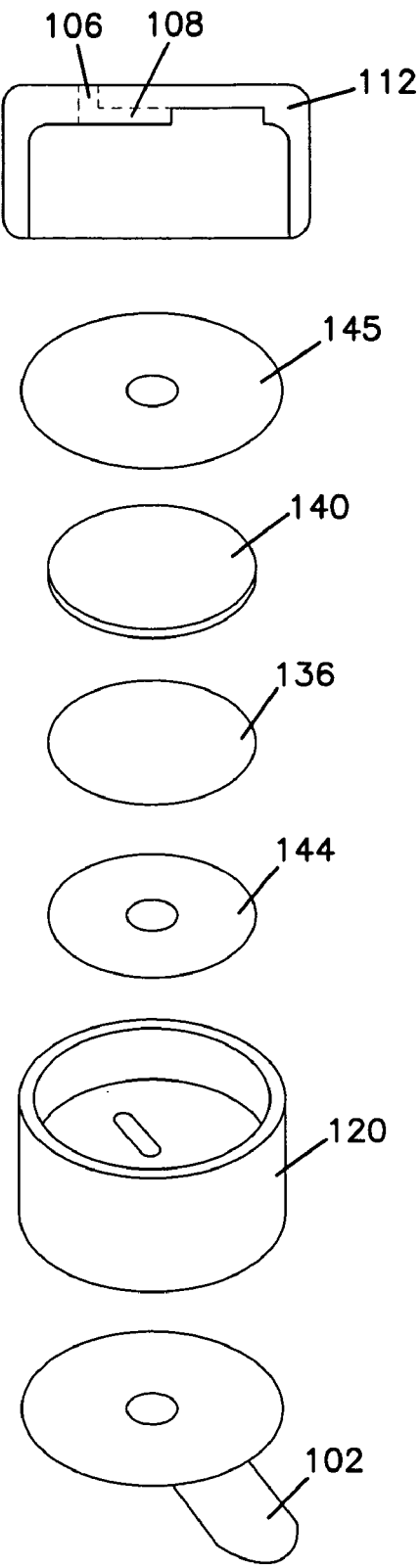

DUAL DIFFUSION CHANNEL FILTER

FIELD OF THE INVENTION

The present invention is, in general, directed to filters and methods of making and using the filters, as well as assemblies having the filters. More particularly, the present invention relates to electronic enclosure filters having at least two diffusion channels.

BACKGROUND OF THE INVENTION

Filters are useful in a variety of devices. For example, filters are often used in electrical or optical equipment. An air pressure differential between the interior and exterior of a housing containing the equipment can be produced as the electrical or optical equipment heats and cools. Often the housing includes a vent or breather hole to allow airflow that equalizes the pressure. A filter is typically provided over the vent to reduce the flow of contaminants into and/or out of the housing.

Computer disk drives, and in particular, hard disk drives, are one example of a device that uses filters in this manner. Disk drives are sensitive to moisture, chemical contamination, and particulate contamination, particularly, as the drive heads become smaller and aerial densities increase. Chemical contaminants, such as hydrocarbons and acid gases, can condense onto a disk and degrade the head/disk interface and/or corrode the heads. Particulate contaminants can lead to stiction and can cause read/write errors and head crashes.

Therefore, a need exists for filters that provide beneficial removal of particulate and chemical contaminants.

SUMMARY OF THE INVENTION

To increase the lifetime of filter material, particularly adsorbent filter material, a long and narrow airflow path is often provided leading into the adsorbent filter media. This flow path may be within the walls of the housing, in a cover disposed against the housing, or in the body of the filter so that air flows along the path, through the filter, and into the interior of the housing. This path is often referred to as a diffusion channel. Example diffusion channels are disclosed and described in Tuma et al. (U.S. Pat. No. 5,997,614), herein incorporated by reference.

The presence of a diffusion channel can reduce the amount of chemical contaminants and moisture reaching the adsorbent material of the filter and/or the inside of the disk drive, thereby prolonging the useful life of the adsorbent material. However, current designs only provide for one diffusion channel, in between the filter and the exterior of the housing. The limitations of designs containing only one diffusion channel, in between the filter and the exterior of the housing, include the undesirable reintroduction of contaminants into the interior of the electronic enclosure. When electronic equipment is heating up during operation, the adsorbent contained within filters of current designs typically desorbs. With a diffusion channel in between the filter and the exterior of the housing, and no diffusion channel in between the filter and the interior of the housing, the desorbed contaminants can preferentially diffuse into the electronic enclosure. Furthermore, current designs allow volatile contaminants within the electronic enclosure such as disk lubricants to reach the adsorbent thereby reducing its useful life.

Generally, the present invention relates to electronic enclosure filters that contain two or more diffusion channels. Typically, one diffusion channel is disposed in the fluid flow path between the filter and the exterior of the enclosure and another is disposed in the fluid flow path between the filter and the interior of the enclosure. The adsorbent of this multiple diffusion channel filter is disposed in fluid communication with both diffusion channels and is located between the two channels. The dual diffusion channel filter of the invention prevents desorbed contaminants from preferentially diffusing into the electronic enclosure, and further extends the useful life of the adsorbent material. In embodiments with a separate recirculation filter, the filter further prevents volatile contaminants from within the drive enclosure, such as disk lubricants, from reaching the adsorbent material.

While not intending to be bound by theory, the rate of diffusion of a fluid is dependent upon the cross-sectional area through which diffusion takes place. Since a diffusion channel provides a smaller cross-sectional area than a standard opening, gases will diffuse through a standard opening at a faster rate than through a diffusion channel. Where a filter has a diffusion channel in fluid communication with the exterior of the drive enclosure and a standard opening in fluid communication with the interior of the drive enclosure, this can lead to preferential diffusion of contaminants that desorb from the adsorbent material back into the electronic enclosure. However, where a diffusion channel is provided upon both sides of the interior of a filter, the rate of diffusion through each channel can be equalized or at least made more equivalent such that contaminants that desorb from the filter material would not preferentially diffuse back into the electronic enclosure.

Moreover, the fluid residence time within the interior of a filter is increased where a diffusion channel is provided upon both sides of the filter. This increases the interaction between the fluid and the adsorbent thereby increasing the effectiveness of the adsorbent.

In embodiments where there is a separate recirculation filter, the presence of a diffusion channel in between the interior of the electronic enclosure and the adsorbent material of a breather filter prevents water vapor and disk lubricants that may be present inside the electronic enclosure from reaching the adsorbent of the breather filter, thereby increasing the useful life of that adsorbent material.

In one embodiment the filter of the present invention includes a housing having a top and a base. The housing further defines an internal volume. Adsorbent filter media is disposed within the internal volume of the housing. The housing has a first diffusion channel configured and arranged to provide fluid communication between the interior chamber of the housing and the exterior of the electronic enclosure. The housing also has a second diffusion channel configured and arranged to provide fluid communication between the interior chamber of the housing and the interior of the electronic enclosure.

The housing typically comprises a non-porous material. A porous membrane is typically disposed in the airflow path between the adsorbent filter media and the interior of the electronic enclosure. A porous membrane or other media may also be disposed in the airflow path between the adsorbent filter media and the exterior of the electronic enclosure. The porous membrane can be, for example, a polytetrafluoroethylene membrane. The media could be a woven or nonwoven filter media.

A mounting adhesive may also be disposed on the filter and is used to hold the filter in place within an electronic enclosure. The filter media comprises, for example, carbon filter material. Also, a porous support layer can be disposed within the internal volume, and the filter media may be mounted on the porous support layer.

The above summary of the present invention is not intended to describe each disclosed embodiment or every implementation of the present invention. The Figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, wherein like numerals represent like parts throughout the several views, in which:

FIG. 1D is a top plan view of a filter constructed in accordance with an implementation of the invention showing an alternative embodiment where dashed lines indicate the location of diffusion channels.

FIG. 2 is a side cross-sectional view of the filter of FIG. 1A.

FIG. 3 is an exploded perspective view of a filter constructed and arranged in accordance with an implementation of the invention.

Figure 1A:
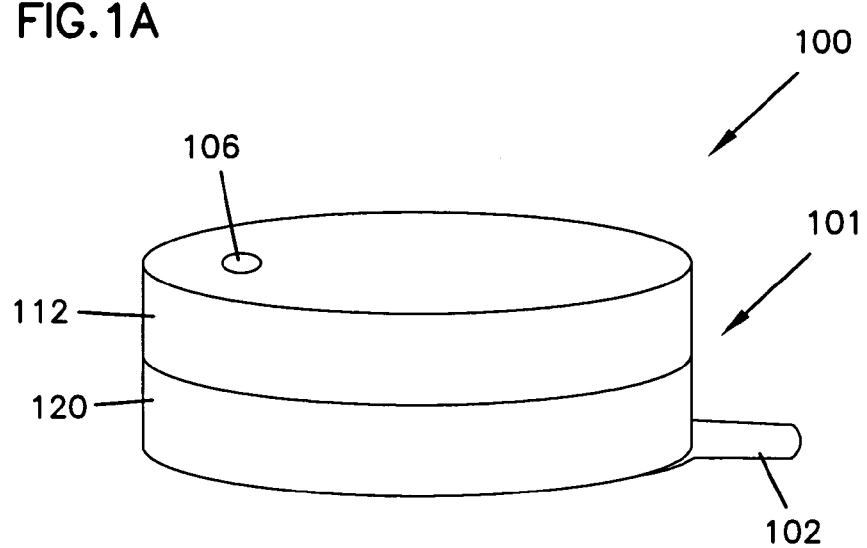
FIG. 1A is a front perspective view of a filter constructed and arranged in accordance with the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENT

The present invention is believed to be applicable to filters and methods of making and using filters to filter a fluid, such as, for example, air or other gases. In particular, the present invention is directed to breather filters having multiple diffusion channels and methods of making and using these breather filters. While the present invention may not be so limited, an appreciation of various aspects of the invention will be gained through a discussion of the example embodiments provided below.

Breather filters act to reduce or eliminate contaminants from air that is exchanged with the exterior of an electronic enclosure. Breather filters are typically placed over a hole or port in the electronic enclosure through which air is exchanged.

Diffusion channels are regions in the airflow path of a filter that typically have a smaller cross-sectional area than the adjoining regions of the airflow path such that they could be described as constricting the airflow path. The constriction in a diffusion channel typically covers an extended length of the airflow channel.

The present invention includes breather filters with multiple diffusion channels, which prevent contaminants from re-entering the interior of the electronic enclosure and help prolong the useful life of the adsorbent filter material. Having at least two diffusion channels prevents contaminants that may desorb from the adsorbent layer from preferentially diffusing back into the interior of the electronic enclosure. Furthermore, in embodiments with a separate recirculation filter, the presence of a diffusion channel in between the interior of the electronic enclosure and the adsorbent material prevents volatile contaminants such as disk lubricants that may be present inside the electronic enclosure from reaching the adsorbent in the breather filter, thereby increasing the useful life of the adsorbent material.

One example of a filter 100 of the present invention is shown in FIG. 1A. FIG. 1A shows a cylindrical filter body 101 made up of a top half 112 and a bottom half 120. The top half 112 and the bottom half 120 of body 101 are attached together. A variety of means can be used for attachment including mechanical compression attachment, adhesive attachment, ultrasonics, etc. An optional release liner 102 is shown adhered to the underside of the bottom half 120. The release liner 102 is on one side of an adhesive layer (not shown) while the other side of the adhesive layer is adhered to bottom half 120. The adhesive layer (not shown) facilitates mounting of the filter 100 within an electronic enclosure. A top exterior hole 106 is shown in the top half 112 of the filter and leads to the interior diffusion channel (not shown).

Figure 1B:
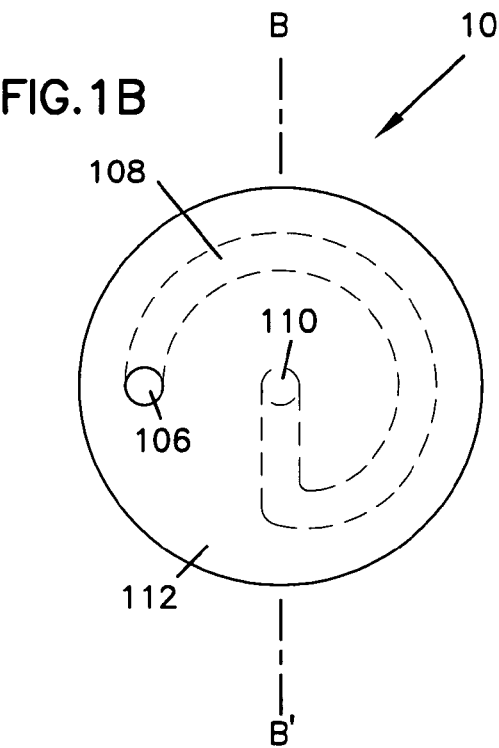
FIG. 1B is a top plan view of the filter of FIG. 1A, showing dashed lines for the location of a diffusion channel.

FIG. 1B shows a top plan view of the filter 100 of FIG. 1A, showing dashed lines for the location of the interior diffusion channel 108 which permits the flow of air from the interior of an enclosure into the interior of filter 100. The interior diffusion channel 108 is defined by the top half 112 of the filter, in this embodiment. The interior diffusion channel 108 has a top exterior hole 106 on one end and a top interior hole 110 on the other end. The interior diffusion channel 108 provides an airflow path with a cross-sectional area that is small enough to restrict diffusion through the airflow path leading to the interior of the electronic enclosure. The interior diffusion channel may be made with varying cross-sectional areas depending on the amount by which diffusion may be desired to be limited for the particular application. In operation, where the air pressure inside the electronic enclosure is higher than outside the electronic enclosure, air will enter top exterior hole 106, travel through interior diffusion channel 108 and pass through top interior hole 110 before entering the interior cavity of the filter assembly (not shown).

Figure 1C:
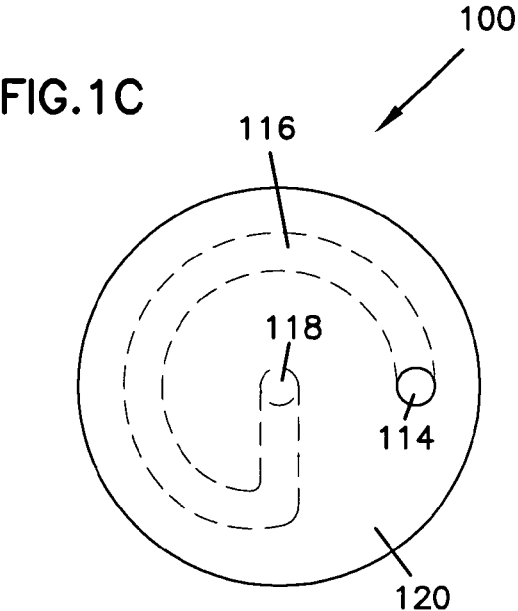
FIG. 1C is a bottom plan view of the filter of FIG. 1A, showing dashed lines for the location of a diffusion channel.

FIG. 1C shows a bottom plan view of the filter of FIG. 1A, showing dashed lines for the location of the exterior diffusion channel 116. The exterior diffusion channel 116 is defined by the bottom half 120 of the filter, in this embodiment. The exterior diffusion channel 116 has a bottom exterior hole 114 on one end and a bottom interior hole 118 on the other end. Bottom exterior hole 114 is disposed to be in fluid communication with a breather hole in the electronic enclosure. While FIG. 1C shows an exterior diffusion channel 116 flow path that is similar in shape to the one shown in FIG. 1B for the interior diffusion channel 108, these two diffusion channels may in practice take on different shapes, lengths, and configurations based on the requirements of the particular application. In operation, where the air pressure inside the electronic enclosure is higher than outside the electronic enclosure, air passes through the interior diffusion channel 108 as described above and enters the interior cavity of the filter assembly. From there the air will pass through an adsorbent material and then into the bottom interior hole 118 and travel through the exterior diffusion channel 116 and pass through the top exterior hole 114 before passing through the breather hole of the electronic enclosure and to the exterior of the enclosure.

Filters of the present invention with multiple diffusion channels can take on many different configurations. An alternative configuration wherein two diffusion channels are located on the same side of the filter is shown in FIG. 1D. This alternative configuration filter 121 has a generally cylindrical shape with an end 123 that defines two separate diffusion channels 125 and 127. Exterior diffusion channel 125 is connected to the outside of the drive enclosure via exterior hole 122. Exterior hole 122 is configured to be in fluid communication with a breather hole in the electronic enclosure (not shown). There is a first filter hole 124 that connects the exterior diffusion channel 125 with the interior of the filter. Interior diffusion channel 127 is connected to the inside of the drive enclosure via interior hole 126. There is a second filter hole 128 that connects the interior diffusion channel 127 with the interior of the filter. In situations where filter 121 is positioned with end 123 in contact with the shell of a drive enclosure, interior hole 126 is typically in fluid communication with the interior volume of the drive enclosure via a depression or channel made in the shell of the drive enclosure. However, interior hole 126 may also be in fluid communication with the interior volume of the drive enclosure via other means. Thus filters of the present invention may have multiple diffusion channels on the same side of the filter body or on different sides.

FIG. 2 shows a side cross-sectional view of the filter of FIG. 1A. The housing of filter 100 is formed by a top half 112 and a bottom half 120. The top half 112 and the bottom half 120 are attached together. A variety of means can be used for the attachment including mechanical compression attachment, adhesive attachment, ultrasonics, etc.

Where the air pressure outside the filter is higher than inside the filter, air can flow through the bottom exterior hole 114 and into the exterior diffusion channel 116. The air can then flow through the exterior diffusion channel 116 and into the interior cavity 138 of the filter assembly. Here the air can interact with the adsorbent material 140. The air can then flow out of the interior cavity 138 and into the interior diffusion channel 108. From there the air can flow out the top exterior hole 106 and into the interior of the electronic enclosure. Where the air pressure outside the filter is lower than inside the filter, air will flow in the opposite direction as that described above.

Two particulate filter layers 130, 132 are shown in FIG. 2. An interior side particulate filter layer 130 is shown on top of top half 112. This particulate filter 130 prevents particulate matter inside the filter assembly from passing into the interior of the electronic enclosure. The particulate filter layer may be constructed of many different materials and is further discussed below. A particulate filter layer may also be positioned in other places in the filter assembly. For example, while the particulate filter layer 130 is shown mounted on the outer surface of the filter housing on top half 112, the particulate filter layer 130 can also be positioned on the inner surface of the filter housing. Generally, the particulate filter layer 130 is positioned so that all air moving through the filter assembly into the electronic enclosure must pass through it and is positioned in between an adsorbent material 140 and the interior of the electronic enclosure.

The adsorbent material 140 can be a chemisorbent and/or physisorbent. The adsorbent material 140 works to remove contaminants from the airflow that moves through the filter assembly. The adsorbent material 140 may have surface features such as one or more projections 142. In addition to providing a path for fluid flow around the filter media, the projections 142 can also provide an increased surface area for interaction with the fluid. The increase in surface area is typically related to factors, such as, the number of projections, their cross-sectional area, the distance the projections extend from the main body, and the shape of the projections. The projections 142 can also provide obstacles to the direct flow of air over the surface of the shaped adsorbent article and can redirect air flow (e.g., by producing eddy currents) toward that surface, thereby increasing filter efficiency. The adsorbent material 140 may be supported by a layer of scrim 136 on the bottom. The adsorbent material 140 may also, in some embodiments, be supported by a layer of scrim 134 on the top.

FIG. 2 shows a cross-sectional view of filter 100, taken along lines B–B' of FIG. 1B. Filter 100 has two diffusion channels, 108, 116 with an interior diffusion channel 108 and an exterior diffusion channel 116. The interior diffusion channel 108 is defined by the top half 112 of the filter, in this embodiment. The interior diffusion channel 108 has a top exterior hole 106 on one end and a top interior hole 110 on the other end. The exterior diffusion channel 116 is defined by the bottom half 120 of the filter, in this embodiment. The exterior diffusion channel 116 has a bottom exterior hole 114 on one end and a bottom interior hole 118 on the other end. Bottom exterior hole 114 is configured to be in fluid communication with a breather hole in the electronic enclosure.

FIG. 3 shows an exploded view of an embodiment of the invention. A cylindrical filter body made up of a top half 112 (shown in cross section) and a bottom half 120 (shown in profile). The top half 112 and the bottom half 120 are configured to be attached together. An optional release liner 102 is shown adhered to the underside of the bottom half 120. The release liner 102 is on one side of an adhesive layer (not shown) while the other side of the adhesive layer is adhered to bottom half 120. A top exterior hole 106 is shown in the top half 112 of the filter and leads to the interior diffusion channel 108.

The embodiment shown in FIG. 3 has two adhesive rings, 144, 145 for keeping the parts of the filter 100 together. Exterior adhesive ring 144 is configured to be in contact with bottom half 120 and a layer of scrim 136. Interior adhesive ring 145 is positioned between top half 112 and adsorbent material 140. The layer of scrim 136 shown is this embodiment is positioned beneath adsorbent material 140 and provides support to the adsorbent. The adhesive rings 144, 145 of this embodiment have a ring shape with a center portion that is open.

Figure 4:
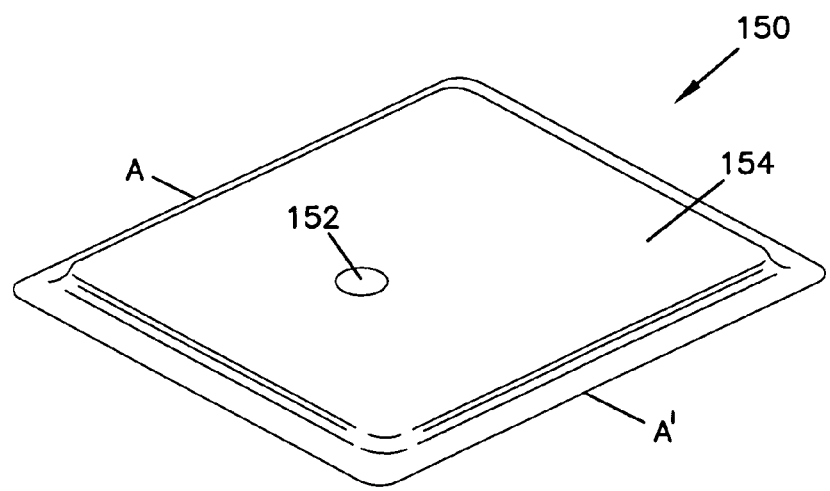
FIG. 4 is a front perspective view of a filter constructed in accordance with an implementation of the invention.

The use of multiple diffusion channels can be applied to many different types of filter construction. FIG. 4 shows an embodiment of the invention in the context of a label type filter. The label filter 150 has a top layer 154 of a non-permeable material. Top layer 154 defines an interior side hole 152 that leads to an interior diffusion channel (not shown).

Figure 5A:
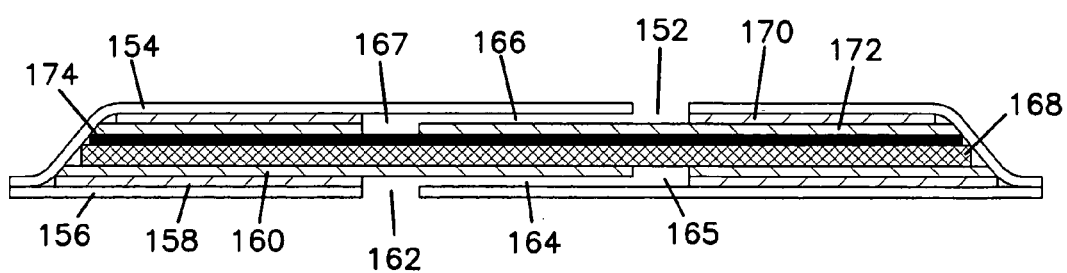
FIG. 5A is a side cross-sectional view of the filter of FIG. 4 taken along line A–A' constructed and arranged in accordance with the invention.

FIG. 5A shows a cross-sectional view of the filter of FIG. 4 taken along lines A–A' of FIG. 4. Top layer 154 is attached to bottom layer 156 at the periphery of the label filter. Top layer 154 and bottom layer 156 define a cavity into which the other components of the filter fit. Top layer 154 defines an interior side hole 152 which leads to an interior diffusion channel 166. Interior diffusion channel 166 connects to the cavity of the filter via a first filter hole 167. The interior diffusion channel 166 and the first filter hole 167 are defined by two layers of non-permeable material: a channel layer 170 and a boundary layer 172. The two layers of non-permeable material 170 and 172 may be attached via a low out-gassing adhesive, although one skilled in the art will appreciate that there are many ways to attach layers of non-permeable material together.

Similarly, bottom layer 156 defines an exterior side hole 162 which leads to an exterior diffusion channel 164. Exterior diffusion channel 164 connects to the cavity of the filter via a second filter hole 165. The exterior diffusion channel 164 and the second filter hole 165 are defined by two layers of non-permeable material: a channel layer 158 and a boundary layer 160. The two layers of non-permeable material 158 and 160 may be attached via a low out-gassing adhesive.

Inside the cavity defined by the top layer 154 and the bottom layer 156, and in between the interior diffusion channel 166 and the exterior diffusion channel 164, is the adsorbent layer 168. In this embodiment the adsorbent layer 168 is supported by a layer of scrim 174 which underlies the adsorbent layer 168.

In operation, when the air pressure inside the electronic enclosure is greater than outside the electronic enclosure, air will move from the interior of the enclosure through interior side hole 152 and into interior diffusion channel 166. From there the air will pass through first filter hole 167 before moving into the interior cavity of the filter assembly. The air will pass through the adsorbent layer 168 and a layer of scrim 174 before passing through second filter hole 165. From there, the air will travel through exterior diffusion channel 164 before exiting through exterior side hole 162.

Figure 5B:
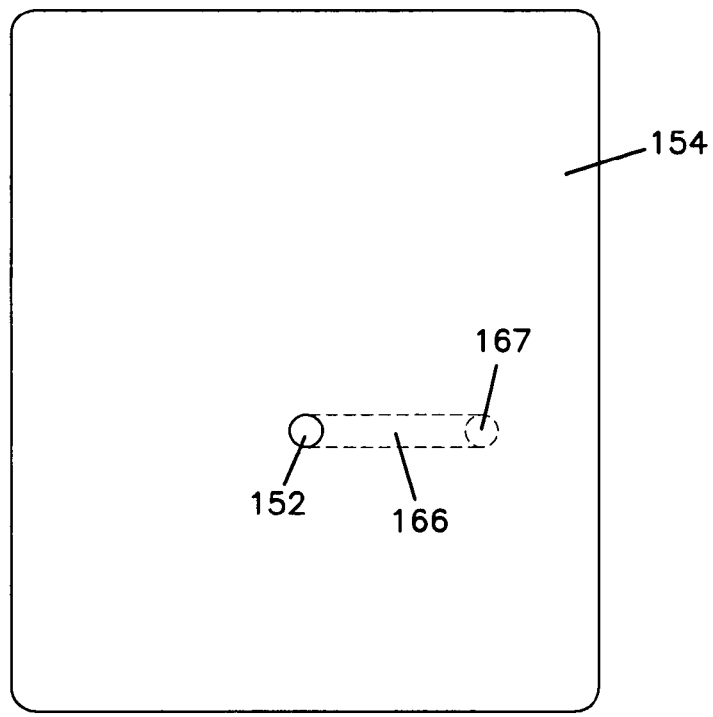
FIG. 5B is a top plan view of the filter of FIG. 5A where dashed lines indicate the location of a diffusion channel.

FIG. 5B is a top plan view of the filter of FIG. 5A. Top layer 154 defines an interior side hole 152 that leads to an interior diffusion channel 166. Interior diffusion channel 166 connects to the cavity of the filter via a first filter hole 167.

Figure 5C:
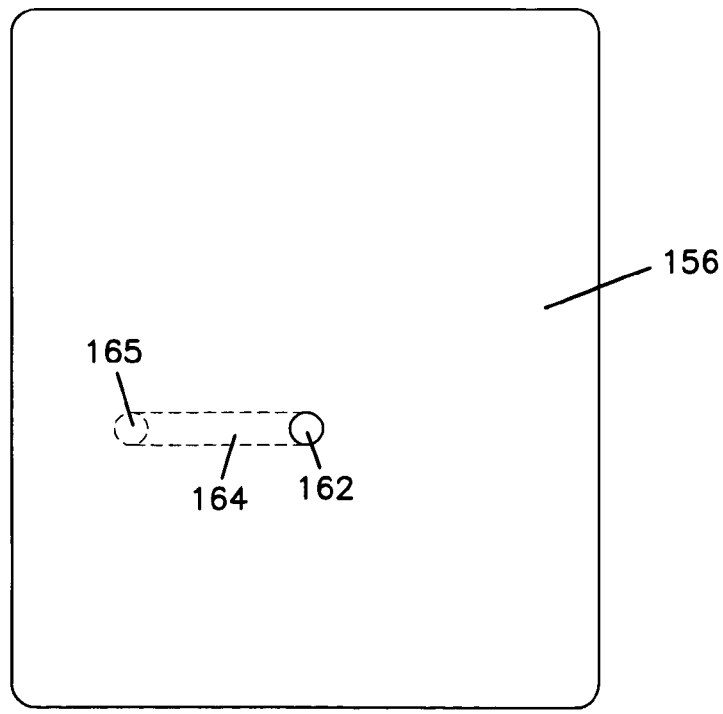
FIG. 5C is a bottom plan view of the filter of FIG. 5A where dashed lines indicate the location of a diffusion channel.

FIG. 5C is a bottom plan view of the filter of FIG. 5B. Bottom layer 156 defines an exterior side hole 162 that leads to an exterior diffusion channel 164. Exterior diffusion channel 164 connects to the cavity of the filter via a second filter hole 165. Exterior side hole 162 is configured to be in fluid communication with a breather hole in the electronic enclosure.

Figure 5D:
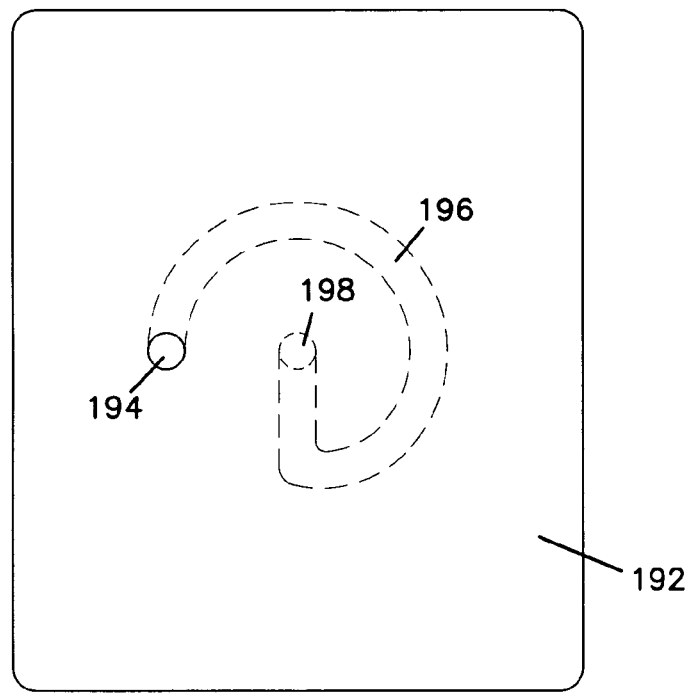
FIG. 5D is a top plan view of an alternative embodiment of a filter constructed in accordance with the invention where dashed lines indicate the location of a diffusion channel.

FIG. 5D is a top plan view of an alternative embodiment of a label filter design of the present invention showing an alternative design for the diffusion channels. Top layer 192 defines an interior side hole 194 that leads to an interior diffusion channel 196. Interior diffusion channel 196 connects to the cavity of the filter via a first filter hole 198.

Figure 5E:
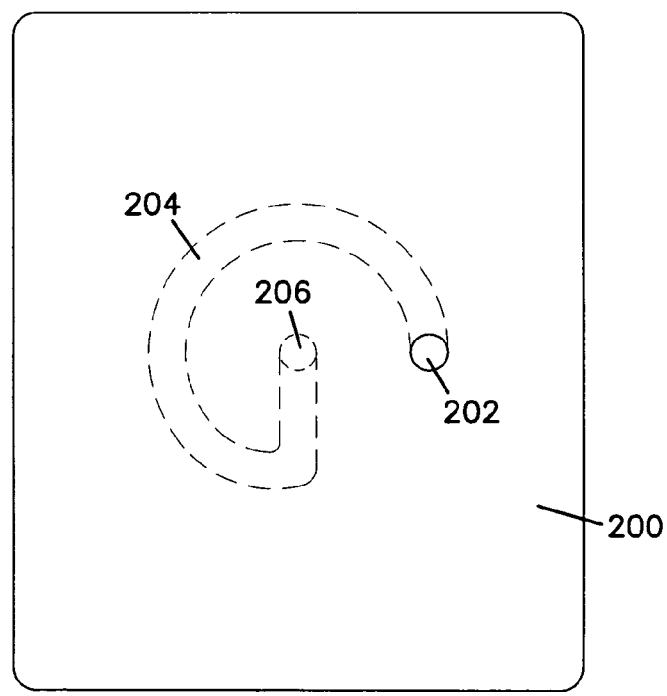
FIG. 5E is a bottom plan view of the filter of FIG. 5D where dashed lines indicate the location of a diffusion channel.

FIG. 5E is a bottom plan view of the filter of FIG. 5D. Bottom layer 200 defines an exterior side hole 202 that leads to an exterior diffusion channel 204. Exterior diffusion channel 204 connects to the cavity of the filter via a second filter hole 206. Exterior side hole 202 is configured to be in fluid communication with a breather hole in the electronic device enclosure.

The foregoing figures described several embodiments of the present invention. However, one of skill in the art will appreciate that many different embodiments are possible without deviating from the spirit of the invention. Select aspects of the invention will now be discussed in greater detail.

Adsorbent Material

It will be understood that adsorbent filter material used in accordance with the invention includes materials that adsorb and/or absorb contaminants through physisorption and/or chemisorption. The adsorbent material can include physisorbents and/or chemisorbents, such as desiccants (i.e., materials that adsorb or absorb water or water vapor) and/or materials that adsorb volatile organic compounds and/or acid gas. The adsorbent material may include a single type of material or a combination of materials. Examples of suitable adsorbent materials include, for example, activated carbon, activated alumina, molecular sieves, silica gels, desiccating materials, potassium permanganate, calcium carbonate, potassium carbonate, sodium carbonate, calcium sulfate, or mixtures thereof. The adsorbent material may be in the form of, for example, particles, gels, sheets, webs, tablets, molded articles, or liquids, that are, preferably, held in place within the filter.

The adsorbent material may remove a single contaminant or a number of contaminants. Examples of contaminants that may be removed include, for example, water, water vapor, chlorine, hydrogen sulfide, HCl, nitrogen dioxide, acid gases, volatile organic compounds, and hydrocarbon compounds.

For typical operation, an adsorbent material that is stable and adsorbs within a temperature range of −40° C. to 100° C. is preferred. Preferably, the adsorbent material is a powder (passes through 100 mesh U.S.S.) or granular material (28 to 200 mesh) prior to forming the adsorbent layer.

In some implementations, the adsorbent material is combined with a binder material. The binder is typically dry, powdered, and/or granular and is mixed with the adsorbent. In some embodiments, the binder and adsorbent material are mixed using a temporary liquid binder and then dried. Typically, a binder is used that does not completely coat the adsorbent material. Suitable binders include, for example, microcrystalline cellulose, polyvinyl alcohol, starch, carboxyl methylcellulose, polyvinylpyrrolidone, dicalcium phosphate dihydrate, sodium silicate, latex and polytetrafluoroethylene.

The composition of the adsorbent layer can include for example at least about 70%, by weight, and typically not more than about 98%, by weight, adsorbent. In some instances, the adsorbent layer includes 85 to 95%, preferably, approximately 90%, by weight, adsorbent. The adsorbent layer typically includes not less than about 2%, by weight, binder and not more than about 30%, by weight, binder. In some instances, the adsorbent layer includes about 5 to 15%, and, preferably, about 10%, by weight, binder.

In some instances, where the adsorbent layer is molded, it may be desirable to include a small amount of lubricant such as PTFE (Teflon® powder) within the composition, in order to facilitate mold release. When PTFE is used, preferably no more than about 10%, and more preferably less than about 3% of the composition, comprises added lubricant. If a lubricant is used, preferably a minimum amount effective to accomplish a desirably reproducible mold release, is used.

The adsorbent layer may be supported by one or more support layers, such as a support scrim. Examples of such support layers include woven and non-woven films/fabrics made from, for example, stretched or sintered plastics, such as polyesters, polypropylene, polyethylene, and polyamides (e.g., nylon). In some embodiments, the support layer may be porous and permit substantial cross-flow of fluid across the support layer and into other portions of the filter media.

Diffusion Channel Configurations

Diffusion channels as used in the present invention may take on many different shapes and may be formed in many different ways. One shape for a diffusion channel is a semi-circular pattern such as that shown in FIG. 1B. Alternately, a diffusion channel may be substantially straight such as the pattern shown in FIG. 5D. The channel may also be formed to have a more complex path, such as a winding path or a spiral path. The channel may, in some embodiments, have two or more branches. One skilled in the art will appreciate that there are many different diffusion channel patterns that are possible without deviating from the spirit of the invention.

The diffusion channel may be formed with the housing (e.g., molded or compression molded) or may be later formed in the housing by cutting or otherwise removing material from the housing. Alternatively, separate diffusion channel layers, with a diffusion channel defined therein, may be formed as separate pieces and inserted into the interior of the housing or attached, for example, adhesively, to the exterior of the housing. This separate piece may be, for example, a molded article or a polymer film having a channel formed therein.

The channel can be formed, for example, by removing a portion of the channel layer. The portion of the channel layer can be, for example, die-cut or otherwise removed using, for example, a stamping apparatus or a rotary press.

Such channels have a thickness that typically corresponds to the combined thickness of the channel layer and any adhesives used for attachment. The width of the channel can vary over a wide range. The width of the channel ranges from, for example, 1 mm to 10 mm, although wider or narrower channels may be used. In some embodiments, the width of the channel ranges from 1.5 to 5 mm. The width and thickness of the channel may be chosen to balance the pressure drop of the filter 100 between the channel and the filter media, although this is not necessary to the invention.

In some embodiments of the invention, one or more diffusion channels are formed in components that adjoin the filter body and not in the filter body itself. For example, creating a narrow depression in the electronic enclosure itself may form a diffusion channel. In this type of configuration, the breather hole in the electronic enclosure is at one end of the narrow depression and the hole leading into the filter assembly is positioned at the other end of the narrow depression when the filter is attached to the electronic enclosure.

Retrofit Applications

The present invention may also be used in the context of retrofit applications. Where filters of previous designs may have only one or no diffusion channels, they can be retrofitted with another diffusion channel to improve their performance. The design of the retrofit device will obviously depend upon the particular filter to be upgraded. For example, where one desires to upgrade an old style cylindrical cap type filter so that it is equipped with two diffusion channels, a retrofit cap can be made with a diffusion channel and be configured to simply fit over the top of the old design via a compression type fitting, such as a snap-on fitting. As another example, where the old style filter to be upgraded is a label style filter, a diffusion channel can be fashioned from one or more layers of flexible material and can be adhered to the top of an existing label filter via a layer of a low out-gassing adhesive. One skilled in the art will appreciate that there are numerous ways of crafting retrofit components to convert old style filters into filters with two or more diffusion channels in accordance with the present invention. In the retrofit context, design is only constrained by the shape of the filter to be upgraded.

Adhesives

The filter of the present invention as constructed in practice may contain a variety of adhesives such as a mounting adhesive, a lamination adhesive, and media lamination adhesive, which may be the same or different. The adhesives are often a single layer of adhesive that is disposed on or applied to, for example, the channel layer, boundary layer, and/or filter media. These adhesives can be disposed on the appropriate layer by, for example, coating, painting, spraying, dipping, or otherwise applying the adhesive to the layer. In some embodiments, adhesive may be pre-applied on a commercially available film. The adhesives can also be double-sided adhesive films that include an adhesive carrier with adhesive disposed on both sides. The adhesive carrier is often a polymer film, such as, for example, a polyethylene, polypropylene, polyester, polycarbonate, polyurethane, or polyvinyl chloride film.

In many embodiments, the adhesives include only low out-gassing adhesives. Out-gassing includes the release and/or production of gaseous or other contaminants by the adhesive. Out-gassing by an adhesive or other component of the filter can produce additional contaminants that are often introduced into the fluid and removed by the filter media. Contamination of the fluid by adhesive out-gassing can also be decreased by reducing, and, preferably, minimizing, the exposure of the fluid flowing through the filter to the adhesives. Often, adhesives are chosen which meet ASTM E-595-84 specifications with 1% or less total mass loss and 0.1% or less collected volatile condensable material. This, however, is not necessary to the invention.

Typically, the adhesives in the filter have individual thicknesses that range from 10 μm to 150 μm, although thicker or thinner adhesives may be used. Often, the adhesives of the filter have a thickness that ranges from 15 μm to 50 μm.

Particulate Filter Layer

Filters of the present invention may contain one or more particulate filter layers to prevent particulate contaminants from entering the electronic enclosure from the filter assembly. Such particulate contaminants may originate outside of the electronic enclosure or may be shed from the adsorbent material itself. Filters of the present invention may also include particulate filter layers to prevent particulate contaminants from entering the filter assembly from outside of the electronic enclosure. They may be disposed on the outside of the filter assembly as shown in FIG. 2 or disposed inside of the filter assembly.

The particulate filter layer may comprise a variety of porous or microporous membranes. The size of the pores in the membranes and the thickness of the membranes often determine, at least in part, the size of particles allowed through the membrane and/or filter.

Often the porous or microporous membranes are formed from polymers. Examples of suitable porous or microporous membranes include porous or microporous polyethylene, polypropylene, nylon, polycarbonate, polyester, polyvinyl chloride, polytetrafluoroethylene (PTFE), and other polymeric membranes. One particularly suitable membrane is formed using expanded PTFE, which is described as having nodes and fibrils.

Filter Housing

The filter housing may be, for example, an outer covering, a casing, or a shell. The housing is typically formed from a plastic material, such as, for example, polycarbonate, polyvinyl chloride, nylon, polyethylene, polypropylene, or polyethylene terephthalate (PETG). The housing may be a single piece or, alternatively, the housing may be formed as two or more pieces that are combined together using, for example, an adhesive, mechanical connectors, heat sealing, and/or ultrasonic welding to form, for example, a perimeter seal.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

We claim:

1. A filter assembly comprising: a housing defining an interior chamber, the housing in fluid communication with an electronic enclosure; an adsorbent component within the interior of the housing; a first particulate filter component comprising a porous membrane; a first diffusion channel, the first diffusion channel having an extended length configured and arranged to provide fluid communication between the interior chamber of the housing and the inside of the electronic enclosure; and a second diffusion channel, the second diffusion channel configured and arranged to provide fluid communication between the interior chamber of the housing and the exterior of the electronic enclosure.

2. The filter assembly of claim 1, wherein the adsorbent component is positioned in fluid communication with the first and second diffusion channels.

3. The filter assembly of claim 1, wherein the first and second diffusion channels are of equal length and cross-sectional area.

4. The filter assembly of claim 1, wherein the first particulate filter component is positioned between the adsorbent component and the inside of the electronic enclosure.

5. The filter assembly of claim 1, wherein the first particulate filter component is positioned between the adsorbent component and the first diffusion channel.

6. The filter assembly of claim 1, further comprising a second particulate filter component.

7. The filter assembly of claim 6, wherein the second particulate filter component is positioned between the adsorbent component and the outside of the electronic enclosure.

8. The filter assembly of claim 6, wherein the second particulate filter component is positioned between the adsorbent component and the second diffusion channel.

9. The filter assembly of claim 1, wherein the adsorbent component comprises activated carbon.

10. The filter assembly of claim 1, wherein the porous membrane comprises a polytetrafluoroethylene membrane.

11. The filter assembly of claim 1, wherein the filter assembly is configured and arranged to filter air.

12. A filter assembly comprising: a first layer defining a first aperture; a second layer defining a second aperture; and an adsorbent component positioned between the first and second layers; wherein the first and second layers surround the adsorbent component and define a cavity; a first diffusion channel, the first diffusion channel configured and arranged to provide fluid communication between the cavity and the first aperture; a second diffusion channel, the second diffusion channel configured and arranged to provide fluid communication between the cavity and the second aperture.

13. The filter assembly of claim 12, wherein the adsorbent component is positioned in fluid communication with the first and second diffusion channels.

14. The filter assembly of claim 12, wherein the first and second diffusion channels are of equal length and cross-sectional area.

15. The filter assembly of claim 12, further comprising a first particulate filter component.

16. The filter assembly of claim 15, wherein the first particulate filter component is positioned in between the adsorbent component and the inside of an electronic enclosure.

17. The filter assembly of claim 15, wherein the first particulate filter component is positioned between the adsorbent component and the first diffusion channel.

18. The filter assembly of claim 15, further comprising a second particulate filter component.

19. The filter assembly of claim 18, wherein the second particulate filter component is positioned in between the adsorbent component and the outside of an electronic enclosure.

20. The filter assembly of claim 18, wherein the second particulate filter component is positioned between the adsorbent component and the second diffusion channel.

21. The filter assembly of claim 12, wherein the adsorbent component comprises activated carbon.

22. The filter assembly of claim 15, wherein the first particulate filter component comprises a porous membrane.

23. The filter assembly of claim 22, wherein the porous membrane comprises a polytetrafluoroethylene membrane.

24. The filter assembly of claim 12, wherein the filter assembly is configured and arranged to filter air.

* * * * *